(12) United States Patent
Oroskar et al.

(10) Patent No.: US 8,929,927 B1
(45) Date of Patent: *Jan. 6, 2015

(54) ADJUSTMENT OF COMMUNICATION PARAMETERS IN A COVERAGE AREA BASED ON PREVALENCE OF ECSFB DEVICES IN THE COVERAGE AREA

(71) Applicant: Sprint Spectrum L.P., Overland Park, KS (US)

(72) Inventors: Siddharth S. Oroskar, Overland Park, KS (US); Jasinder P. Singh, Olathe, KS (US); Anoop K. Goyal, Overland Park, KS (US); Maulik K. Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/787,469

(22) Filed: Mar. 6, 2013

Related U.S. Application Data

(63) Continuation-in-part of application No. 13/648,919, filed on Oct. 10, 2012.

(51) Int. Cl.
*H04M 3/00* (2006.01)
*H04W 72/00* (2009.01)
*H04M 1/00* (2006.01)
*H04W 68/00* (2009.01)
*H04L 12/66* (2006.01)
*H04W 24/00* (2009.01)

(52) U.S. Cl.
CPC .................................. *H04W 24/00* (2013.01)
USPC ........ 455/458; 455/418; 455/452.1; 455/453; 455/522.1; 370/352

(58) Field of Classification Search
USPC .............. 455/67.11, 418–420, 423–425, 434, 455/436, 444, 446–451, 453, 452.1–452.2, 455/509–510, 515, 517, 552.1, 550.1, 455/556.2, 560–561; 370/216–221, 252, 370/328–329, 331–332, 338, 341, 352–357
See application file for complete search history.

(56) References Cited

U.S. PATENT DOCUMENTS

| | | | |
|---|---|---|---|
| 8,682,357 B2 | 3/2014 | Worrall | |
| 2008/0254814 A1 | 10/2008 | Harris et al. | |
| 2011/0195714 A1 | 8/2011 | Sawinathan | |
| 2012/0028661 A1 | 2/2012 | Fang et al. | |

*Primary Examiner* — Meless Zewdu (57) ABSTRACT

Disclosed herein are methods and systems that may help to adjust, e.g., CDMA paging and access parameters in a coverage area, based on the prevalence of devices that are configured for enhanced circuit switch fallback (eCSFB) in the coverage area. For example, a base station in a radio access network (RAN) may: determine a measure of circuit switch fallback (CSFB) device prevalence in a coverage area, use the measure of CSFB-device prevalence in the coverage area as a basis for updating one or more paging parameters for communications via a paging channel defined under the first air-interface protocol; and apply the one or more updated paging parameters to communications with devices via the paging channel defined under the first air-interface protocol.

20 Claims, 6 Drawing Sheets

ADJUSTMENT OF COMMUNICATION PARAMETERS IN A COVERAGE AREA BASED ON PREVALENCE OF ECSFB DEVICES IN THE COVERAGE AREA

RELATED APPLICATION

This application is a continuation-in-part of U.S. patent application Ser. No. 13/648,919, filed on Oct. 10, 2012, which is hereby incorporated by reference in its entirety.

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air-interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1 xEV-DO", or "EVDO")), iDEN, WiMAX (e.g., IEEE 802.16), Long-Term Evolution (LTE), TDMA, AMPS, GSM, GPRS, UMTS, or EDGE, and others now known or later developed.

The air-interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access probes" such as registration messages and call origination requests, and (ii) traffic channels on which WCDs may transmit bearer traffic for receipt by the RAN.

In a conventional CDMA wireless network compliant with the well-known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

OVERVIEW

In networks that provide service under both Long-Term Evolution (LTE) and an older CDMA protocol (e.g., IS-2000 and/or IS-856), service providers may implement circuit switch fallback (CSFB) and/or enhanced circuit switch fallback (eCSFB) functionality, which allows service providers to use their existing CDMA network for voice calls, while at the same time using LTE to support mobile broadband.

Note, that wireless communication devices (WCDs) may need to configured for CSFB and eCSFB in order to be compatible with network-side implementation of CSFB and eCSFB functionality. Herein, a WCD that is configured for CSFB and/or eCSFB, may be referred to as either a "CSFB device" or "eCSFB device." On the other hand, WCDs that are not capable of CSFB and/or eCSFB functions may be referred to herein as "non-CSFB devices" or "non-eCSFB WCDs." Note that there may be LTE-capable devices that are not configured for eCSFB, and thus do not know to listen to the LTE paging channel for CDMA pages. As such, a RAN may refrain from implementing eCSFB for such devices, and CDMA pages thus be sent to such devices via the CDMA paging channel.

Under CSFB, a WCD may, by default, operate with its CDMA receiver powered down, and only listen for pages via an LTE paging channel. Thus, when a radio access network (RAN) needs to page a WCD for a voice call, the RAN may first page the WCD via an LTE paging channel. This indicates to the WCD that it should turn on its CDMA receiver and listen to the CDMA paging channel for a page. The RAN can then send the page via the CDMA paging channel. Thus, a WCD operating under CSFB may keep its CDMA receiver powered down, except when it is about to receive a page via the CDMA paging channel.

When eCSFB is implemented, a RAN may generally use its 3G traffic channels for voice calls and 1x-data calls, while using LTE signaling channels for most or possibly even all other signaling functions. As a result, a base station that implements eCSFB may use the LTE control channel for both LTE control channel messages and CDMA control-channel message. Similarly, the base station may use the LTE paging channel for all LTE and CDMA paging-channel messages (e.g., paging, call origination, SMS, feature notification, and other overhead messages), whenever the device with which it is communicating is compatible with such functionality. Configured as such, the base station does not use the CDMA paging and access channels for devices that are operable for eCSFB (referred to herein as "non-eCSFB" devices). Thus, the base station may only revert (e.g., "fall back") to using the CDMA paging and access channels to communicate with devices that aren't configured for CSFB and/or eCSFB.

As the number of CSFB devices increases, both the CDMA paging channel occupancy (PCO) and access channel occupancy (ACO) may decrease due to reduced usage of CDMA paging channels and access channels. Exemplary embodiments may help take advantage of such reduced paging- and access-channel usage in an effort to improve the service provided to non-CSFB devices. For instance, when a higher number or percentage of CSFB devices is detected, paging parameters for a sector's CDMA paging channel may be adjusted so as to increase the paging success rate (PSR) via the CDMA paging channel. Such adjustments may also increase the PCO for the CDMA paging channel, but the increased PCO may be offset at least partially by the increased presence of CSFB devices and the reduction to the PCO for the CDMA paging channel to which the presence of CSFB device corresponds.

In one aspect, an exemplary method involves one or more components of a RAN: (a) determining a measure of CSFB-device prevalence in a coverage area, wherein the RAN is configured to provide service in the coverage area under both a first and a second air-interface protocol, and wherein the RAN is configured to fall back from the second air-interface protocol to second air-interface protocol according to a CSFB procedure; (b) using the measure of CSFB-device prevalence in the coverage area as a basis for updating one or more paging parameters for communications via a paging channel defined under the first air-interface protocol; and (c) applying the one or more updated paging parameters to communications with devices via the paging channel defined under the first air-interface protocol.

In another aspect, a non-transitory computer readable medium may have stored therein instructions that are executable to cause a RAN to perform functions comprising: (a) determining a measure of circuit switch fallback (CSFB) device prevalence in a coverage area, wherein the RAN is configured to provide service in the coverage area under both a first and a second air-interface protocol, and wherein the RAN is configured to fall back from the second air-interface protocol to second air-interface protocol according to a CSFB procedure; (b) using the measure of CSFB-device prevalence in the coverage area as a basis for updating one or more paging parameters for communications via a paging channel defined under the first air-interface protocol; and (c) applying the one or more updated paging parameters to communications with devices via the paging channel defined under the first air-interface protocol.

In a further aspect, an exemplary method involves one or more components of a RAN: (a) determining a measure of circuit switch fallback (CSFB) device prevalence in a coverage area, wherein the RAN is configured to provide service in the coverage area under both a third-generation (3G) protocol and a Long-Term Evolution (LTE) protocol; (b) using the measure of CSFB-device prevalence in the coverage area as a basis for updating one or more paging parameters for communications via a 3G paging channel defined under the 3G protocol; and (c) applying the one or more updated paging parameters to communications with devices via the 3G paging channel.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. EXEMPLARY NETWORK SYSTEMS

Figure 1:
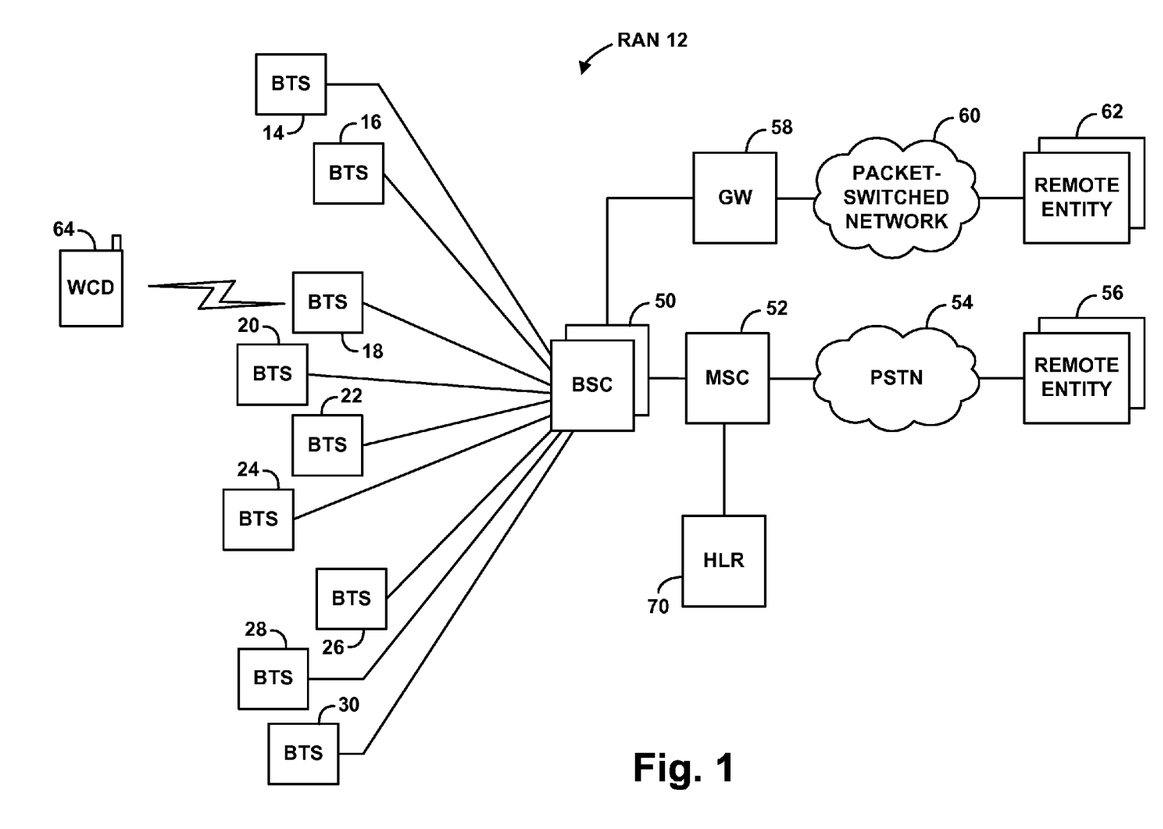
FIG. 1 is a block diagram illustrating a wireless communication network, according to an exemplary embodiment.

Referring to the Figures, FIG. 1 is a block diagram illustrating a wireless communication network, according to an exemplary embodiment. As noted, service providers may implement networks in which service is provided under a CDMA standard (e.g., IS-95, IS-2000, 1xRTT, 1xEV-DO, etc.) as well as under a 4G protocol such as LTE and/or WiMax. Service under both CDMA and LTE (or WiMAX) may be implemented in conjunction with the arrangement shown in FIG. 1, and more specific details of a network with overlapping CDMA and LTE will be discussed in reference to FIG. 2.

As shown in FIG. 1, an exemplary network may include a radio access network (RAN) 12 that radiates to define numerous coverage areas in which wireless communication devices (WCDs) can engage in RF communication with the RAN. Herein, WCDs may also be referred to as "mobile stations," as is common when referring to WCDs in the context of a CDMA network, and also as "user entities" (UEs), as is common when referring to WCDs in the context of an LTE network. Thus, the terms "mobile station," "wireless communication device" (or WCD), and "user entity" (or UE) may be used interchangeably herein. Further, a WCD may be classified herein based on whether or not it is configured for circuit-switched fallback (CSFB) and/or enhanced circuit-switched fallback (eCSFB) functionality, and thus may be referred to as either an "CSFB device" or a "non-CSFB device."

The RAN 12 may define these coverage areas discretely through use of directional antennas and/or by various modulation parameters, including, without limitation, carrier frequencies, PN offsets, and/or other parameters, depending on the air-interface protocol used. Example air-interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include one or more base stations (also referred to as "base transceiver stations" (BTSs)), designated in the figure as base stations 14-30, and one or more base station controllers (BSCs) 50 (which may be integrated with or separate entities from the one or more of the base stations). The base stations preferably include directional antennas, power amplifiers, and associated transceiver equipment arranged to establish corresponding wireless coverage areas and to communicate with WCDs in those coverage areas.

The coverage areas served by base stations 14-30 may be cell sectors, or some other defined wireless coverage area (possibly even a combination of coverage provided by multiple base stations). Each base station 14-30 may serve a single coverage area (e.g., a single cell or sector), or may serve multiple discrete coverage areas, such as multiple sectors, for instance.

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

Note that the combination of a BTS and BSC, or the combination of multiple BTSs and the serving BSC of those BTSs, may be considered a base station. However, a given BTS or BSC could, taken alone, be considered a base station as well. Additionally, a base station may be considered to be either or both of those devices, and perhaps make use of one or more functions provided by an MSC, a PDSN, and/or other entities.

FIG. 1 depicts a representative WCD 64 by way of example, which could be a cell phone, tablet, laptop computer, wirelessly equipped personal digital assistant (PDA), personal computer, home electronic device, or any other type of wirelessly-equipped device now known or later developed. The WCD 64 is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above.

Further, a WCD 64 may include a user interface, which typically includes components for receiving input from a user of a WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Note that when referring to a CDMA network, wireless communication devices (WCDs) may often be referred to as "mobile stations." In other protocols, WCDs may be referred to using different terminology. For example, under LTE, WCDs may be referred to as "user entities" (UEs). Accordingly, the terms "mobile station," "wireless communication device," and "user entity," may be used interchangeably herein.

Each mobile station, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN).

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

Figure 2:
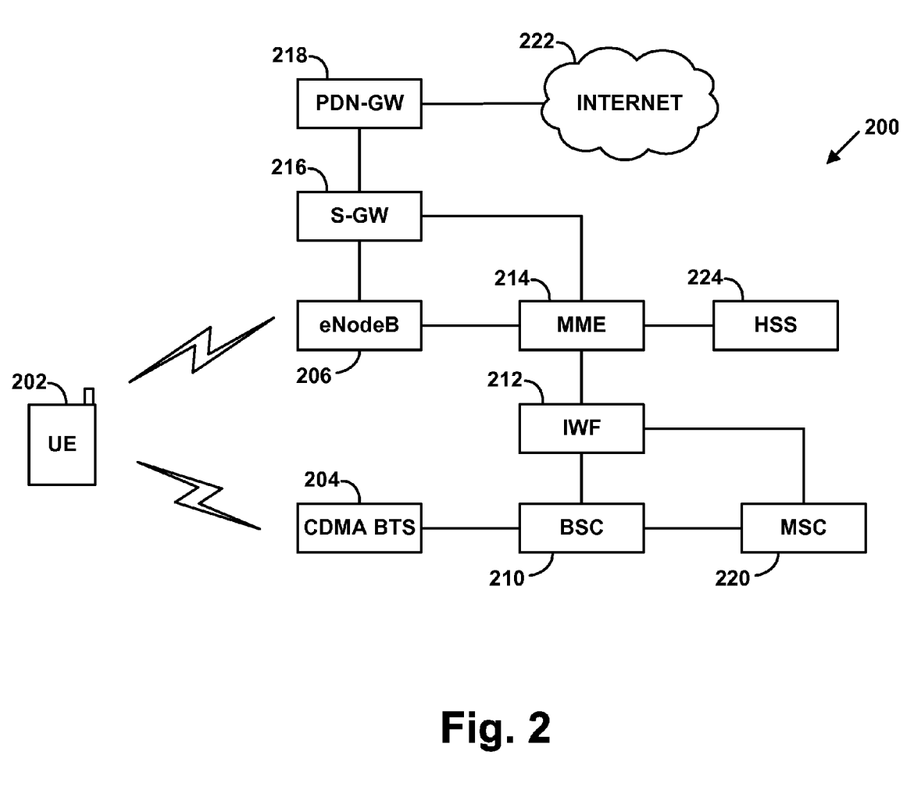
FIG. 2 is a simplified block diagram of a wireless communication network in which a service provider supports wireless service under two or more different air-interface protocols, according to an exemplary embodiment.

As noted above, FIG. 2 is a simplified block diagram of a wireless communication network 200 in which a service provider supports wireless service under two or more different air-interface protocols. In particular, FIG. 2 shows an exemplary RAN that is configured to provide service under both CDMA and LTE. As such, a UE 202 operating in network 200 may connect and communicate under different air-interface protocols, such as CDMA and LTE. In some implementations, network 200 may include two or more separate access networks with overlapping coverage areas (e.g., separate access network for LTE and CDMA), which could both be provided by the same service provider, or might be provided by different service providers. In other implementations, some or all components may be combined so as to support both CDMA and LTE communications, for example.

In the illustrated configuration, network 200 includes components to provide for CDMA communications. Specifically, FIG. 2 shows a BTS 204, a BSC 210, and an MSC 220, which collectively (and possibly in conjunction with other components that help to provide service under CDMA) may be referred to as a CDMA network. Note that BTS 204, BSC 210, and MSC 220 may be configured for the same or similar functions as BTSs 14-30, BSC 50, and MSC 52, which were described in reference to FIG. 1.

Network 200 also includes components to provide a UE 202 with service under LTE. In particular, network 200 includes one or more eNodeBs 206, which are base stations configured to support over-the-air communications with UEs 202 under LTE. Each eNodeB 206 may provide service under LTE in one or more coverage areas, such as a cell or one or more cell-sectors.

To support LTE communications, network 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, paging-message distribution, security functions, authentication of UEs, gateway selection for communications, and so on.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network may include a packet data network gateway (PDN-GW) 218, which facilitates packet-data communications between an S-GW 216 that operates according to LTE, and a packet-data network, such as the Internet 222.

In a further aspect, network 200 includes an interworking function (IWF) 212, which may be a functional component of the network that supports interworking between different wireless technologies, such as CDMA and LTE. In an exemplary configuration, IWF 212 may support communications between components of an LTE network (e.g., MME 214) and components of a CDMA network (e.g., BSC 210 and/or MSC 220), so that a service provider may implement circuit-switched fallback (CSFB) or enhanced circuit-switched fallback (eCSFB) functionality.

CSFB and eCSFB may allow a service provider to deliver voice-services to a UE 202, and/or to provide data provide data services under a CDMA protocol to UE 202, which is not configured for LTE communications. The LTE network and the CDMA network (e.g., the fall back network) may be connected via a tunnel, such as IWF 212.

A UE 202 that is configured for CSFB or eCSFB may register with the CDMA-portion of network 200 via an LTE access channel. More specifically when a UE 202 connects to a LTE network via an eNodeB 206, it can communicate with a CDMA MSC 220 through an IWF 212, which functions to bridge the LTE and CDM networks, encapsulate and relay CDMA messages between the UE 202 and the MSC 220. For example, a UE 202 may send CDMA messages via an eNodeB 206 and an MME 214. The IWF 212 may then encapsulate and relay such CDMA messages to MSC 220.

Further, a UE 202 that is configured for eCSFB may use an LTE access channel to initiate a voice call under CDMA. For instance, when a CSFB device requests to initiate a voice call via an LTE access channel, the LTE network may then notify the CDMA network of the voice call via the bridge provided by IWF 212, so that the call may be established via the CDMA network. For example, MME 214 may notify MSC 220 of UE 202's request to initiate a voice call via IWF 212, so that MSC 220 may reserve CDMA resources for the call.

Yet further, under eCSFB, all paging functionality for both CDMA and LTE communications may be carried out via the LTE paging channel, unless the target UE of the paged is not configured for eCSFB, in which case the CDMA paging channel is used instead. Thus, if most of UEs in a certain geographic area are configured for eCSFB, the number of paging-channel messages being sent via the CDMA paging channel may be significantly reduced.

In another aspect of eCSFB, UEs 202 that are configured for eCSFB may search for an LTE pilot signal first, and only search for a CDMA pilot signal when an LTE pilot signal is unavailable. In addition, eCSFB UEs may use the LTE access channels for all access functionality, such as sending access probes, unless LTE is unavailable. Therefore, if most of UEs 202 in a certain area are configured for eCSFB, the number of access probes being sent via a CDMA paging channel may be significantly reduced. Advantageously, such eCSFB functionality may help a UE 202 to conserve power. In particular, rather than simultaneously using two wireless communication interfaces (e.g., one for LTE communications and one for CDMA communications), eCSFB may allow a UE 202 to turn its CDMA communication interface off at most times.

It should be understood that the network arrangements shown in FIGS. 1 and 2 and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

A. CDMA Paging

In a RAN that is configured for eCSFB, the RAN may still use the CDMA paging channel to page a WCD that is not capable of LTE communications, and/or that is not configured for eCSFB, and thus does not know to listen to the LTE paging channel for both CDMA and LTE pages. Accordingly, a more detailed explanation of CDMA paging is provided below.

Under CDMA, when a RAN seeks to communicate with a WCD (e.g., to establish an incoming voice call or transmit incoming packet data to a WCD), the RAN may first page the WCD on a CDMA paging channel. The purpose of paging the WCD may be to determine whether the WCD is still within range of a preferred wireless coverage area, and if so, to notify the WCD of the incoming communication. If the WCD is successfully paged, the RAN may assign one or more traffic channels to the WCD.

When a WCD is not assigned a traffic channel, the WCD may operate in dormant mode where the WCD monitors the paging channel periodically instead of continuously so as to reduce power consumption. Accordingly, under CDMA, the paging channel may operate in a slotted manner, according to time-division multiplexing (TDM), and multiple WCDs may be grouped together and assigned to the same paging channel slot. In particular, the paging channel is typically divided into a number of time slots (e.g., 32 or 64 slots) of a specific duration (e.g., 80 ms). The group of time slots is defined as a slot cycle, and the slot cycle repeats continuously. For example, a paging channel with 32 slots, each 80 ms in duration, will have a slot cycle of 2.56 seconds. In such a configured, each individual slot repeats every 2.56 seconds. Note that the timing of each slot and/or the slot cycle may differ in other configurations.

When a WCD 64 or UE 202 registers with the network in a given CDMA coverage area, the RAN assigns the WCD to one of the time slots in the slot cycle (generally distributing the WCDs evenly among all of the time slots). When the RAN has a page message to send to a particular WCD, it sends the page during the WCD's assigned time slot. To receive pages from the RAN, a WCD only needs to wake up only during its assigned slot in order to listen for the page; it can remain asleep for the rest of the slot cycle.

Under CDMA, a "slot cycle index" (SCI) typically defines the time slots at which a WCD 64 or UE 202 will check the paging channel for a page request message. Under CDMA2000, a WCD operating at slot cycle index 0 (zero) would listen for a page request message every 1.28 seconds, a WCD operating at slot cycle index 1 would listen for a page request message every 2.56 seconds, a WCD operating at slot cycle index 2 would listen for a page request message every 5.12 seconds, and so on. However, the SCI may take on values less than 0 (zero) and greater than 2.

The SCI of a particular WCD 64 or UE 202 is typically configured in the base station serving the WCD, which may indicate the SCI to WCDs in a coverage area in a system parameters message or in other messages that are broadcast in the coverage area. Note that in some cases, it may be possible for the base station's setting for the SCI to be overridden by the WCD. Further, in some cases, the SCI may be negotiated between the WCD and these RAN components.

At a RAN, paging is typically initiated when an MSC 52 receives an indication that a WCD 64 or UE 202 should be paged (e.g., an incoming call), or when the MSC itself determines that a WCD should be paged. The indication normally includes a WCD identifier, such as a Network Access Identifier (NAI), a Mobile Directory Number (MDN), a Mobile Identification Number (MIN), an International Mobile Subscriber Identifier (IMSI), an electronic serial number (ESN), and/or a mobile equipment identifier (MEID). The MSC may then transmit some representation of the indication to the appropriate BTS or BTSs.

In turn, the BTS 18 may use the WCD identifier to generate a page record, which the BTS may then place in a general page message (GPM) for transmission to the WCD 64. (A GPM may also be referred to as a "page-request message" or just a "page.") The WCD may then reply with to the BTS with a page-response message (PRM) sent via a reverse-link access channel. After receiving the PRM and verifying the page was successfully received, the RAN may then assign one or more traffic channels to the WCD.

In a further aspect, a base station may be configured to create a general page message (GPM) that includes multiple paging-channel messages, such that multiple WCDs can be paged using a single page message. (For clarity, each individual page to a WCD that is included in a larger "general page message" (or GPM) may be referred to as a "page record" or "paging-channel message.") Before transmission, page records may be concatenated so that more page records may be included in a GPM than otherwise could be. For example, in some implementations, one concatenation level may correspond to concatenation that allows up to eight page records to be concatenated in a single GPM. Additionally or alternatively, other concatenation levels may correspond to concatenation of pages in a GPM such that at least five page records may be included in a single GPM.

Without concatenation, a single CDMA page message that occupies two half frames in the paging channel, typically does not include more than four page records. In comparison, when concatenation according to one example concatenation level is applied, a GPM may include two page records that are concatenated such that the GPM can be sent in two to three half frames. This concatenation level may thus allow for five page records to be sent in a single timeslot. Another possible concatenation level may allow for two to eight page records to be concatenated in a GPM that is sent in two half frames, which in turn may allow a base station to transmit eight page records in a timeslot. Other levels of concatenation are also possible.

When multiple page records are concatenated in a GPM, some information that is typically included in a page record may not be repeated for each page record in the GPM. For example, length bits, overhead bits, CRC bits, and reserved bits, are not typically repeated for each page record in a GPM. Thus, while concatenating page records into a GPM may reduce the load on the CDMA paging channel, thereby helping to reduce the CDMA paging-channel occupancy (PCO), concatenation may also result in some page records failing to reach their intended WCDs, thus reducing the paging-success rate (PSR) under CDMA.

In a further aspect of CDMA paging, a RAN may resend a page when a page fails to reach (or seemingly fails to reach) a WCD; possibly making multiple attempts. More specifically, when a RAN does not receive a PRM from a WCD, the base station may attempt to re-page the WCD. In particular, a base station may wait a predetermined period of time (ten seconds, for instance) to receive a PRM. If the base station does not receive such an indication, the base station will resend to the WCD. The base station typically repeats this process until a PRM indicates that the page was successfully received, or until a maximum number of attempts has been made without receiving a PRM, and the page is therefore deemed to have failed.

In an exemplary embodiment, a base station may have various paging-scheme settings that affect the manner in which the switch resends a page. In particular, the base station may define a "maximum-attempt" parameter, the value of which indicates the maximum number of attempts that can be made to send a given page. Further, the base station may track the "paging-attempt status" of a given page; which may also be referred to as the base station's "attempt count" for the page (i.e., how many attempts have been made by the switch to send the page). For example, a base station may include, maintain, or have access to a database that tracks the paging-attempt status of pages initiated by the base station. As such, when a page is successfully received at the intended WCD, and a PRM is received at the base station from which the page was sent, the base station (and its serving switch) may then know not to initiate additional attempts to send the page. On the other hand, if the base station does not receive a PRM indicating that a page attempt was successful, the base station and/or its serving switch may check the paging-attempt status, and if appropriate, make an additional attempt to send the page to the WCD.

In addition, the base station may implement a "page-attempt timer," which the base station uses to determine when to make a subsequent paging attempt. Accordingly, if additional attempts to send the page are possible after the base station makes an attempt to send a page (e.g., if the attempt count for the page is less than the maximum-attempt value), the base station may start the page-attempt timer when it makes the attempt. Then, if no acknowledgement has been received from the WCD when the page-attempt timer expires, the base station may initiate the next attempt to send the page.

B. Sending Overhead Messages over a CDMA Paging Channel

To facilitate access by WCDs, a RAN 12 may broadcast overhead messages in each coverage area it serves. Typically, overhead messages are broadcast over a paging channel in a the coverage area, and provide various types of information to facilitate access to and use of the RAN by WCDs in the coverage area. As such, when WCD enters a coverage area, the WCD may receive such overhead messages and configure itself for operation in the coverage area. Examples of the types of overhead messages that may be sent over a CDMA paging channel include, but are not limited to, system parameters messages, access parameters messages, CDMA channel list messages, order messages, channel assignment messages, data burst messages, authentication messages, shared secret data (SSD) update messages, feature notification messages (FNMs), extended system parameters messages, neighbor list messages, status request messages, service redirection messages, general page messages, global service redirection messages, and/or Temporary Mobile Subscriber Identity (TMSI) assignment messages, among other possibilities.

In an exemplary embodiment, a base station may transmit some overhead messages periodically. Other types of overhead messages may be transmitted on an as-needed basis (although an embodiment where all overhead messages are periodically transmitted is also possible).

Further, overhead-message timing parameters may be set at a base station to adjust the timing for periodically-transmitted overhead messages. Moreover, a base station may separately adjust the timing for different types of overhead messages, such that some types of overhead messages may be sent more frequently than other types. For example, a base station may send access parameters messages and system parameters messages more frequently than other types of overhead messages, such as neighbor list messages. Other examples are also possible.

C. CDMA Quick Paging

In practice, a WCD 64 operating according to CDMA might only be paged a few times per hour. Therefore, waking up every few seconds to check the paging channel be unnecessary in certain scenarios. To further reduce the WCD's waking time, and thus its power consumption, CDMA protocols such as IS-2000 and IS-856 may define a "quick paging channel," over which quick page messages are sent to WCD 64. The purpose of the quick paging channel and the quick page message is to indicate to WCD 64 whether or not the WCD should wake up for the next paging channel slot. For example, if the RAN 12 knows that WCD 64 is going to be paged during the next paging channel slot, then the RAN may indicate to WCD 64 to wake up during the next time slot in order to receive the page message. Otherwise, WCD 64 would stay asleep during the next time slot in order to conserve battery power.

Figure 3:
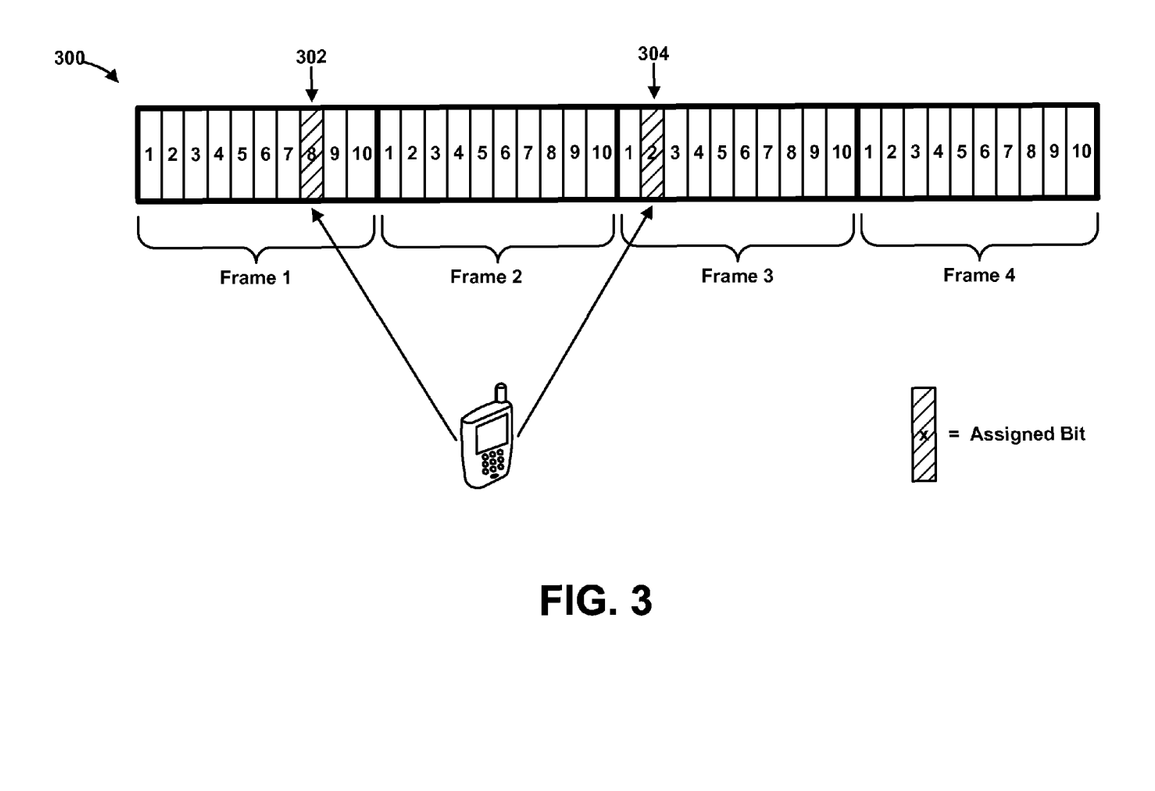
FIG. 3 illustrates an implementation of a quick page message, according to an exemplary embodiment.

The quick paging channel is divided into time slots, similar to that of the paging channel, and the RAN 12 assigns each WCD to a quick paging channel time slot that occurs a short time before that WCD's time slot (e.g., 100 ms before). In this manner, WCD 64 can receive the quick page message early enough to determine whether or not to wake up for the next paging channel time slot. FIG. 3 illustrates one implementation of a quick page message 300 sent to WCD 64 during a quick paging channel time slot. The message 300 includes a plurality of bits (called paging indicator bits), divided into four frames. The RAN 12 assigns each WCD 64 to check the binary state of two of the plurality of bits. A WCD's first indicator bit 302 will appear in one of the first or second frames, while the WCD's second indicator bit 304 will appear in one of the third or fourth frames. Note that in FIG. 3 the frames are shown having ten bits in each frame. However, in practice, more or less bits may be used.

In order to indicate to WCD 64 that it should wake up to receive a page message on the next paging channel slot, the RAN will set both indicator bits 302, 304 in the quick page message 300 sent to WCD 64. A set bit may take on the value of a "one" as opposed to a "zero", for example. When WCD 64 receives the quick page message 300, and determines that both of the assigned indicator bits 302, 304 are set, WCD 64 will wake up during the next paging channel slot. Otherwise, if WCD 64 determines that one or both indicator bits are not set, then WCD 64 will not be paged and so it can remain asleep during the next paging channel slot.

The quick paging operation may use a hashing function to assign the WCDs to two indicator bits in a quick page message. One example of a hashing function that may be used is a Bloom filter. Bloom filters have the possibility of false positives, but not false negatives. Thus, a WCD may determine that both of that WCD's assigned bits are set when the WCD is not actually being paged. However, if a WCD determines that at least one of the WCD's bits 302, 304 are not set, then the WCD can confidentially conclude that it will not be paged. Due to the false positive nature of the hash function, such quick paging cannot replace paging. Moreover, the false positive nature of the hash function may reduce the paging success rate over a CDMA paging channel, when quick paging is utilized.

The RAN 12 broadcasts quick page messages once per quick paging channel time slot. Every WCD assigned to the same quick paging channel time slot then reads the same broadcast quick page message. Depending on how many WCDs are assigned to the same quick paging channel slot, two or more WCDs may need to share a first indicator bit. For example, if there are forty indicator bits sent during the first two frames of a particular quick paging channel slot, and four hundred WCDs assigned to that particular quick paging channel slot, it is clear that the four hundred WCDs will have to be divided among the forty indicator bits. In this case, each first indicator bit will have ten WCDs assigned to it (assuming an even distribution).

The quick page message is much smaller compared with a general page message. In some implementations, the quick page message is about half of the length of a general page message. So when reading a quick page message as compared to a general page message, WCD 64 is awake for about half of the time. Thus, compared to a network that operates without a quick paging channel, quick paging increases the wakeup duration of paged WCDs by about 50%, since paged WCDs will wake for the quick paging channel slot and the paging channel slot. However, quick paging decreases the wake-up duration of unpaged WCDs by also about 50%, since unpaged WCDs wake up for only the quick paging slot and remain asleep during the paging channel slot. Typically only a very small percentage of WCDs are paged. This translates to a 50% increase in waking duration for only a very small percentage of WCDs. For the rest of the WCDs, this translates to a 50% decrease in waking duration. Overall, the wakeup duration of the WCDs is thus reduced.

II. EXEMPLARY RAN COMPONENTS

Figure 4:
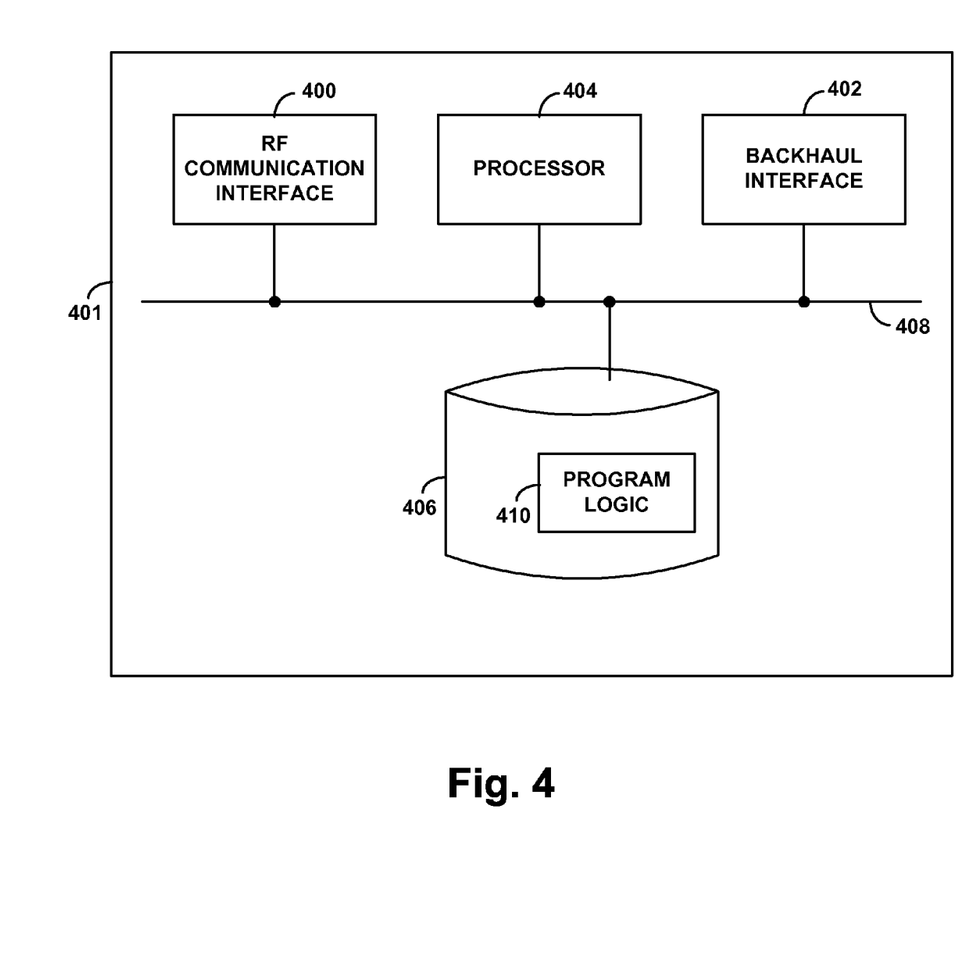
FIG. 4 is a simplified block diagram exemplifying a RAN component, according to an exemplary embodiment.

FIG. 4 is a simplified block diagram illustrating a RAN component, according to an exemplary embodiment. In particular, FIG. 4 illustrates some of the functional components that would likely be found in a RAN component 401 arranged to operate in accordance with the embodiments herein. As shown, the RAN component 401 may include an RF communication interface 400, a backhaul interface 402, a processor 404, and data storage 406, all of which may be communicatively linked together by a system bus, network, or one or more other connection mechanisms 408.

In practice, RAN component 401 may take the form of or include one or more BTS and/or a BSC, such as BTSs 18-24 and/or BSC 50 for instance, or may take the form of a switch, such as MSC 52. Accordingly, the illustrated components of RAN component 401 (e.g., communication interface 400, a backhaul interface 402, a processor 404, and data storage 406) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 401, RF communication interface 400 may comprise one or more antenna structures, one or more power amplifiers, and associated equipment, for engaging in RF communication with mobile stations operating within the base station's coverage, according to one of the air-interface protocols noted above for instance. Backhaul interface 402 may comprise any sort of communication link or mechanism enabling the base station to exchange signaling and bearer data with other RAN entities, such as with MSC 52 for instance. Processor 404 may comprise one or more processors (e.g., general purpose and/or special purpose processors), such as microprocessors for instance.

Data storage 406 may be a non-transitory computer readable medium. For example, data storage 406 may take the form of one or more volatile and/or non-volatile storage components, such as magnetic, optical, or organic storage components, integrated in whole or in part with processor 404.

As further shown, data storage 406 contains program logic 410 (e.g., machine language instructions) executable by processor 404 to carry out various functions, such as the functionality of the exemplary methods and systems described herein. In an exemplary embodiment, data storage 406 may include program instructions that are executable by processor 404 to provide the various functionality of a RAN and components thereof, which is described herein.

III. EXEMPLARY METHODS

Figure 5:
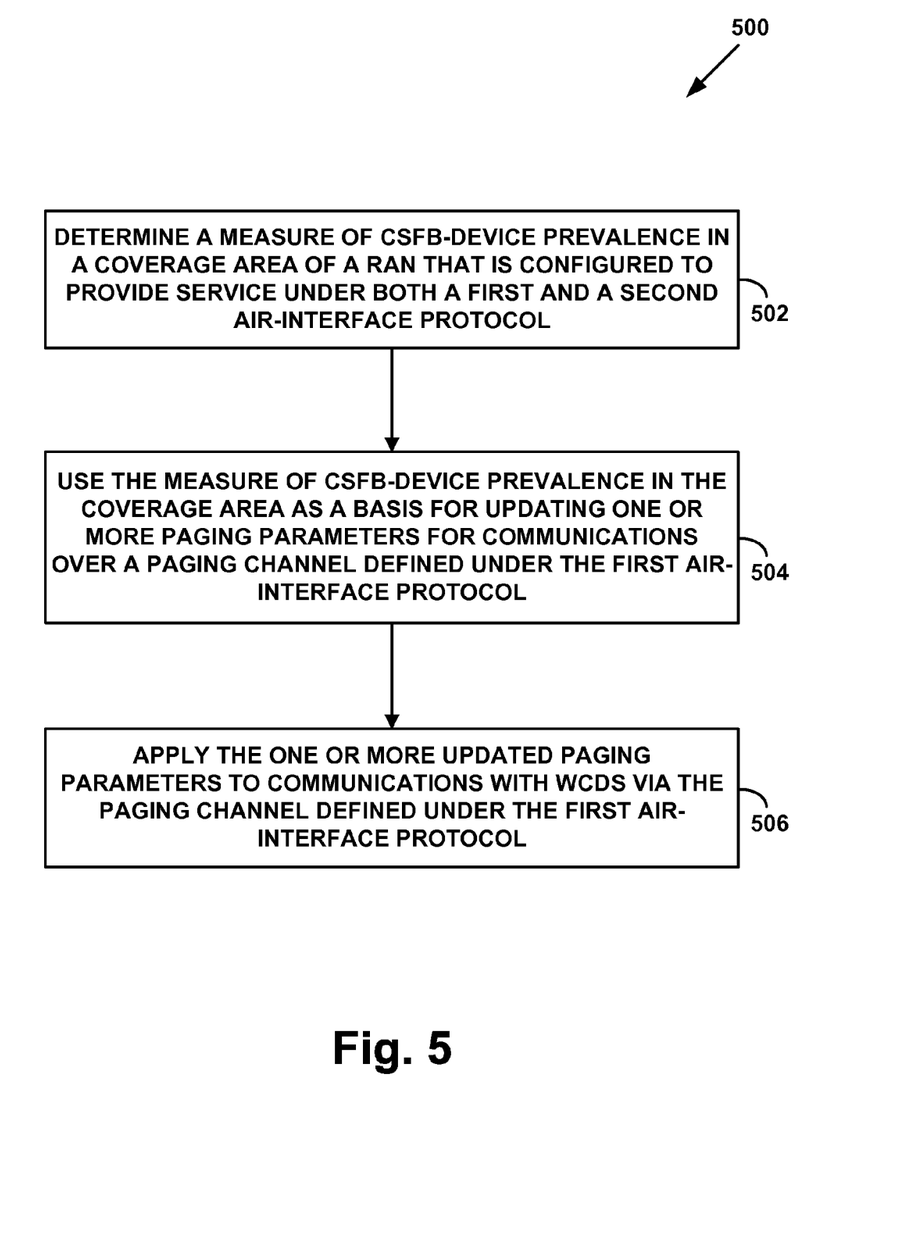
FIG. 5 is a flow chart illustrating a method, according to an exemplary embodiment.

FIG. 5 is a flow chart illustrating a method 500, according to an exemplary embodiment. Method 500 may be implemented by a component or components of a RAN, such as by a base station and/or by a switch. Herein, method 500 is described as being implemented by a base station or base stations in a RAN (e.g., by a BTS, BTS/BSC combination, or an eNodeB). However, other implementations are possible. Further, method 500 may be implemented in a RAN that is configured to provide service under both a first and a second air-interface protocol (e.g., under both a CDMA protocol, such as IS-2000 and/or IS-856, and under a 4G data protocol such as LTE and/or WiMAX). Alternatively, method 500 may be implemented by a base station in a CDMA network, which is not configured to provide service under LTE, but which is configured to communicate with an LTE network via an IWF or another inter-networking entity. Similarly, method 500 could be implemented by a base station in an LTE network, which is not configured to provide service under an earlier CDMA protocol, but which is configured to communicate with an earlier CDMA network via an IWF or another inter-networking entity.

Further, a RAN that implements method 500 may be configured to communicate with non-eCSFB-capable WCDs via a first channel defined under the first air-interface protocol and to communicate with eCSFB-capable WCDs via a second channel defined under the second air-interface protocol. For instance, the RAN may use a first paging channel defined under the first air-interface protocol (e.g., a CDMA paging channel) to send certain messages to non-CSFB devices, which it does not send to CSFB devices. Similarly, the RAN may be configured to send certain messages to CSFB devices via a second paging channel defined under the second air-interface protocol (e.g., an LTE paging channel), which it does not send to non-CSFB devices.

Additionally or alternatively, the RAN may use a first access channel defined under the first air-interface protocol (e.g., a CDMA access channel) for certain access-channel communications with non-CSFB devices, and instead use a second paging channel defined under the second air-interface protocol (e.g., an LTE access channel) for the same access-channel communications with CSFB devices.

As shown by block 502, method 500 may involve a base station determining a measure of CSFB-device prevalence in a coverage area (e.g., in a sector or sectors that are served by the base station). Further, the base station uses the measure of CSFB-device prevalence in the coverage area as a basis for updating one or more paging parameters for communications over a paging channel defined under the first air-interface protocol, as shown by block 504. The base station may then apply the one or more updated paging parameters to communications with WCDs via the paging channel defined under the first air interface protocol, as shown by block 506.

IV. DETERMINING THE ECSFB-DEVICE PREVALENCE IN A COVERAGE AREA

At block 502 of method 500, a base station may determine the measure of CSFB-device prevalence in various ways, depending upon the particular implementation. Generally, the measure of CSFB-device prevalence in a given coverage area may be a quantitative indication of how prevalent CSFB-devices have been, how prevalent CSFB-devices currently are, and/or how prevalent CSFB-devices are scheduled to be and/or expected to be, in the given coverage area. Further, the measure of CSFB-device prevalence in a given coverage area may be based only on the devices capable of CSFB, only on the devices capable of eCSFB, or on devices that are capable of CSFB, eCSFB, or both.

In some embodiments, the measure of CSFB-device prevalence in a coverage area may be the number of CSFB devices that are associated with the coverage area. In such an embodiment, the base station may determine the measure of CSFB-device prevalence by determining how many CSFB devices are currently registered in a given sector that is served by the base station. In particular, when a WCD registers with the RAN in a given sector, the WCD may include, in its registration message, an indication as to whether it is capable of CSFB and/or eCSFB. This information may be stored by the RAN in a database, such that the information can be accessed to determine how many CSFB devices are registered in a given sector.

Further, in some embodiments, the measure of CSFB-device prevalence may be calculated to be equal to, or otherwise based upon, the percentage of all the devices associated with the coverage area that are CSFB devices. For example, the RAN may determine the measure of CSFB-device prevalence by determining the number of CSFB devices that are currently registered in the coverage area, and the total number of devices (both eCSFB and non-CSFB) that are currently registered in the coverage area. The RAN may then determine the percentage of all devices that are eCSFB-compatible by dividing the current number of CSFB devices by the total number of devices that are currently registered in the coverage area.

Additionally or alternatively, the RAN could determine the measure of CSFB-device prevalence based on historical prevalence of CSFB-devices in a coverage area. For example, CSFB-device prevalence may be determined based on the average number of CSFB-devices that operate in the coverage area at a given point in time. More specifically, the RAN may periodically or from time-to-time determine how many CSFB devices are currently registered in the coverage area, and maintain a database of this information. The RAN may then calculate CSFB-device prevalence to be equal to, or to be otherwise based on, the average number of CSFB devices that are registered in the coverage area at a given point in time. The average may be determined over all time, or may be determined as a moving average over a certain period of time.

As another example, CSFB-device prevalence in a given coverage area may be based on the historical percentage of devices in the coverage area that are eCSFB-compatible. For instance, the RAN may include or have access to a database that includes historical records indicating whether or not devices that register in a given coverage area are eCSFB-compatible (e.g., whether or not each device that registers is configured for communications under both LTE and a CDMA protocol). The RAN may then access this data to calculate CSFB-device prevalence by, e.g., determining the historical percentage of the devices that register in a given coverage area that are eCSFB-compatible. This historical percentage may be determined over all time or over a predetermined window of time (e.g., by determining the percentage of devices that are eCSFB-compatible over the last hour, the last day, the last week, etc.).

It should be understood that the above-described techniques for determining a measure of CSFB-device prevalence in a coverage area are provided for illustrative purposes, and are not intended to be limiting. Other measures of CSFB-device prevalence, and other techniques for determining such measures, are also possible.

V. DETERMINING CDMA PAGING PARAMETERS BASED ON CSFB-DEVICE PREVALENCE

As noted above, a RAN that implements method 500 may use a first paging channel to send paging-channel messages to non-CSFB devices, and instead use a second paging channel to send paging-channel messages to CSFB devices. For instance, a base station may use the LTE paging channel for both CDMA and LTE paging to CSFB devices. However since non-CSFB device may not be capable of communications under LTE (or, if configured for LTE communications, may not know to listen to the LTE paging channel for CDMA pages), the base station may use a CDMA paging channel for CDMA paging to non-CSFB devices.

In such a configuration, block 504 may involve the RAN determining one or more paging parameters for communications over the first paging channel (e.g., a CDMA paging channel). Such paging parameters may include, but are not limited to: (a) a quick-paging setting (e.g., to enable or disable quick paging), (b) a setting that indicates the period at which a device in the coverage area should listen to the paging channel (e.g., the slot cycle index), and/or (c) an overhead-message timing parameter (e.g., a parameter specifying how frequently to send a given type of overhead message)

Such paging parameters may additionally or alternatively include, but are not limited to: (a) the concatenation level to be used for paging-channel messages, (b) a maximum-attempt parameter for a coverage area, which specifies a maximum number of attempts to send the page that can be made in the coverage area, and/or (c) a duration of a page-attempt timer for re-transmission of pages in the coverage area, among other possibilities. Other paging parameters may also be determined based on CSFB-device prevalence, without departing from the scope of the invention.

A. Updating Quick-Paging Functionality Based on CSFB-Device Prevalence

In some embodiments, block 504 of method 500 may involve the RAN determining at least one quick-paging setting for a coverage area, based on the measure of CSFB-device prevalence in the coverage area.

More specifically, while utilization of a quick-paging function may help WCDs conserve power, quick paging can also reduce the paging success rate (PSR) in a coverage area. Specifically, there is greater chance of an error occurring with the transmission of the single bit, which is sent over the quick-paging channel to indicate whether or not a page to a WCD is forthcoming, than there is of an error occurring in the transmission of a full page message to the WCD. Thus, in practice, the use of a quick-paging function has been observed to reduce the PSR. Accordingly, when a coverage area serves a large number and/or percentage of WCDs are CSFB-devices, a RAN may improve the paging success rate via the CDMA paging channel by turning off quick paging.

For instance, a base station may dynamically enable and disable quick paging in a coverage area, depending upon the measure of CSFB-device prevalence at a given point in time. To do so, the RAN may determine and/or set a threshold measure of CSFB-device prevalence. Then, if the measure of CSFB-device prevalence in a given coverage area is determined to be greater than the predetermined threshold, a base station may disable the quick-paging function in the coverage area. Otherwise, when the measure of CSFB-device prevalence in the coverage area is below the predetermined threshold, the base station may enable the quick-paging function in the coverage area. Note that the threshold may vary according to the particular implementation. Further, a threshold may be set for all coverage areas in a RAN, for a subset of the coverage areas in a RAN, or independently for each coverage area in the RAN.

In an exemplary embodiment, a CDMA base station may enable and disable the quick-paging function by adjusting its settings so that it will no longer send out quick page messages, and, more generally, so that it discontinues use of the quick paging channel. In a further aspect, the base station may transmit a message or messages to indicate that the quick-paging function is disabled, so that WCDs in the coverage area know not to utilize quick paging. For instance, a base station may include an indication as to whether or not quick paging is enabled or disabled in in system parameters messages and/or in other types of overhead messages, which the base station broadcasts in the coverage area.

B. Updating Paging-Slot Settings Based on CSFB-Device Prevalence

In some embodiments, block 504 of method 500 may involve the RAN determining a period at which a device in the coverage area should listen to the paging channel. In particular, a CDMA base station may dynamically determine a value for the slot cycle index in a given coverage area, based on the measure of CSFB-device prevalence in the coverage area. By decreasing or increasing the value of the slot cycle index when a coverage area serves more or less CSFB-devices, respectively, a base station may improve the user-experience and/or provide other improvements to service under CDMA. In particular, decreasing or increasing the value of the slot cycle index will increase or decrease the frequency with which a WCDs assigned slot occurs. As such, the WCD may receive incoming page messages (and other messages sent over the paging channel) more quickly, which may reduce call set-up time and/or provide other improvements to the user-experience.

For instance, if the measure of CSFB-device prevalence is less than a predetermined threshold, then the base station may set the slot cycle index to be equal to a first value, which corresponds to a first period between successive paging-channel slots that are assigned to a given device. For example, if the CSFB-device prevalence is less than the threshold, then the base station may set the slot cycle index equal to "2,"

which indicates to WCDs in the coverage area to wake up and listen to the paging channel once every 5.12 seconds. On the other hand, if the measure of CSFB-device prevalence is greater than the predetermined threshold, then the base station may set the slot cycle index to be equal to a second value, which corresponds to a second period between successive paging-channel slots that are assigned to a given device, where the second period is shorter than the first period. For example, if the CSFB-device prevalence is greater than the threshold, then the base station may set the slot cycle index equal to "1," which indicates to WCDs in the coverage area to wake up and listen to the paging channel once every 2.56 seconds.

Further, in some embodiments, the slot cycle index may be set more granularly. For example, a first and second threshold for CSFB-device prevalence may be defined, with the second threshold being greater than the first threshold. Then, if the CSFB-device prevalence is less than the first threshold, the base station may set the slot cycle index equal to "2," which indicates to WCDs in the coverage area to wake up and listen to the paging channel once every 5.12 seconds. If the CSFB-device prevalence is greater than the first threshold, but less than the second threshold, then the base station may set the slot cycle index equal to "1," which indicates to WCDs in the coverage area to wake up and listen to the paging channel once every 2.56 seconds. And, if the CSFB-device prevalence is greater than the second threshold, then the base station may set the slot cycle index equal to "1," which indicates to WCDs in the coverage area to wake up and listen to the paging channel once every 2.56 seconds.

It should be understood that the above examples are not intended to be limiting. It is contemplated that a base station could use other techniques to determine the slot cycle index. Further, a base station could use techniques other than changing the slot cycle index in order to adjust the period at which WCDs in a coverage area should periodically wake up and listen to the paging channel.

Further, it should be understood that the period that is determined may also be viewed in terms of a WCD's assigned slots. In other words, block 504 of method 500 may also involve the RAN determining the period at adjusting the period between successive slots in the slot cycle that are assigned to each WCD in a coverage area.

C. Updating Periodic Overhead Messaging Based on CSFB-Device Prevalence

In some embodiments, block 504 of method 500 may involve the RAN determining a value for each of one or more overhead-message timing parameters, which may each affect how often at least one type or type of overhead message is transmitted over a paging channel defined under the first air-interface protocol (e.g., a CDMA paging channel).

By sending overhead messages more frequently when the CSFB-device prevalence is higher, a RAN may be able to take advantage of unused bandwidth on a CDMA paging channel to provide various types of CDMA information to WCDs more quickly. For example, if a CDMA base station transmits system parameters messages more frequently, then WCDs being served by the CDMA base station may learn of updates to system information more quickly. As another example, if a CDMA base station transmits access parameters messages more frequently, then WCDs being served by the CDMA base station may be informed more quickly of updates to access information (e.g., updates to the access process such as transmit-power changes and/or changes to how access probes are sent and acknowledge). Other examples are also possible.

In an exemplary embodiment, an overhead-message timing parameter may indicate a period between successive transmissions of a particular type of overhead message over the paging channel defined under the first air-interface protocol (e.g., a CDMA paging channel). Accordingly, the RAN may increase or decrease the period between successive transmission transmissions of a particular type of overhead message (and correspondingly decrease or increase the frequency at which the particular type of overhead message is sent), as the CSFB-device prevalence decreases or increases, respectively.

For example, an overhead-message timing parameter may be set to indicate either of two different periods between successive transmissions of a given type of overhead message, with the second period being shorter than the first period (meaning that periodically transmitting messages according to the second period results in more frequent transmissions). Accordingly, if the measure of CSFB-device prevalence in a coverage area is less than a predetermined threshold, then the base station may set a given overhead-message timing parameter to indicate the first period between successive transmissions of a particular type of overhead message. On the other hand, if the measure of CSFB-device prevalence is greater than the predetermined threshold, then the base station may set the overhead-message timing parameter to indicate the second period between successive transmissions of the particular type of overhead message, such that the particular type of overhead message is sent more frequently.

In some embodiments, each overhead-message timing parameter may affect the timing of one particular type of overhead message. In such an embodiment, an exemplary method 500 may be implemented to update the overhead-message timing parameter for just one type of overhead message. For example, an exemplary method 500 may be implemented to update the period between consecutive transmissions of system parameters messages. Alternatively, an exemplary method 500 may be implemented to separately update each of two or more overhead-message timing parameters, where each overhead-message timing parameter affects a different type of overhead message. As an example, an exemplary method 500 may be implemented to both (a) update a first overhead-message timing parameter that indicates the period between consecutive transmissions of system parameters messages and (b) update a second overhead-message timing parameter that indicates the period between consecutive transmissions of access parameters messages. Other examples are also possible.

In other embodiments, a single overhead-message timing parameter could affect the timing for two or more types of overhead messages. For instance, in some cases, one overhead-message timing parameter may specify a period between consecutive transmissions, which applies to all overhead messages sent over a CDMA paging channel in a given coverage area. In other cases, one overhead-message timing parameter may specify a period between consecutive transmissions of a set of two or more types of overhead messages (i.e., a subset of all overhead messages). In such case, an exemplary method 500 could be implemented to update the overhead-message timing parameter for one set of two or more types of overhead messages, or to update multiple overhead-message timing parameters, which each apply to a different set of two or more overhead messages.

D. Adjusting the Concatenation Level

In some embodiments, a base station may determine a concatenation level to be used for paging-channel messages sent via the first paging channel (e.g., via the CDMA paging channel), based at least in part on the measure of CSFB-device prevalence that was determined at block 502. For instance, in an exemplary embodiment, a concatenation level may be selected such that less concatenation is applied to paging-channel messages when the eCSFB-WCD prevalence is higher, while comparatively more concatenation is applied to paging-channel messages when the eCSFB-WCD prevalence is lower. In such an embodiment, a base station may attempt to increase the PSR via when the number and/or percentage of WCDs that are eCSFB-compatible is higher and there is likely to be more bandwidth available on the CDMA paging channel by reducing the amount of concatenation (or possibly turning off concatenation altogether).

As a specific example, the selection of a concatenation level may involve a base station determining whether or not the eCSFB-WCD prevalence in a sector is greater than a predetermined threshold. Then, if the eCSFB-WCD prevalence is greater than the threshold, the base station may select a concatenation level such that page messages of the first type are not concatenated (or are concatenated by a lesser amount than when the eCSFB-WCD prevalence is below the threshold). On the other hand, if the eCSFB-WCD prevalence is less than the threshold, the base station may select a higher concatenation level. In some embodiments, this may simply involve turning on and off a concatenation feature for paging-channel messages sent via the CDMA paging channel in a given sector, depending upon whether the eCSFB-WCD prevalence in the sector is less than or greater than the threshold.

Figure 6:
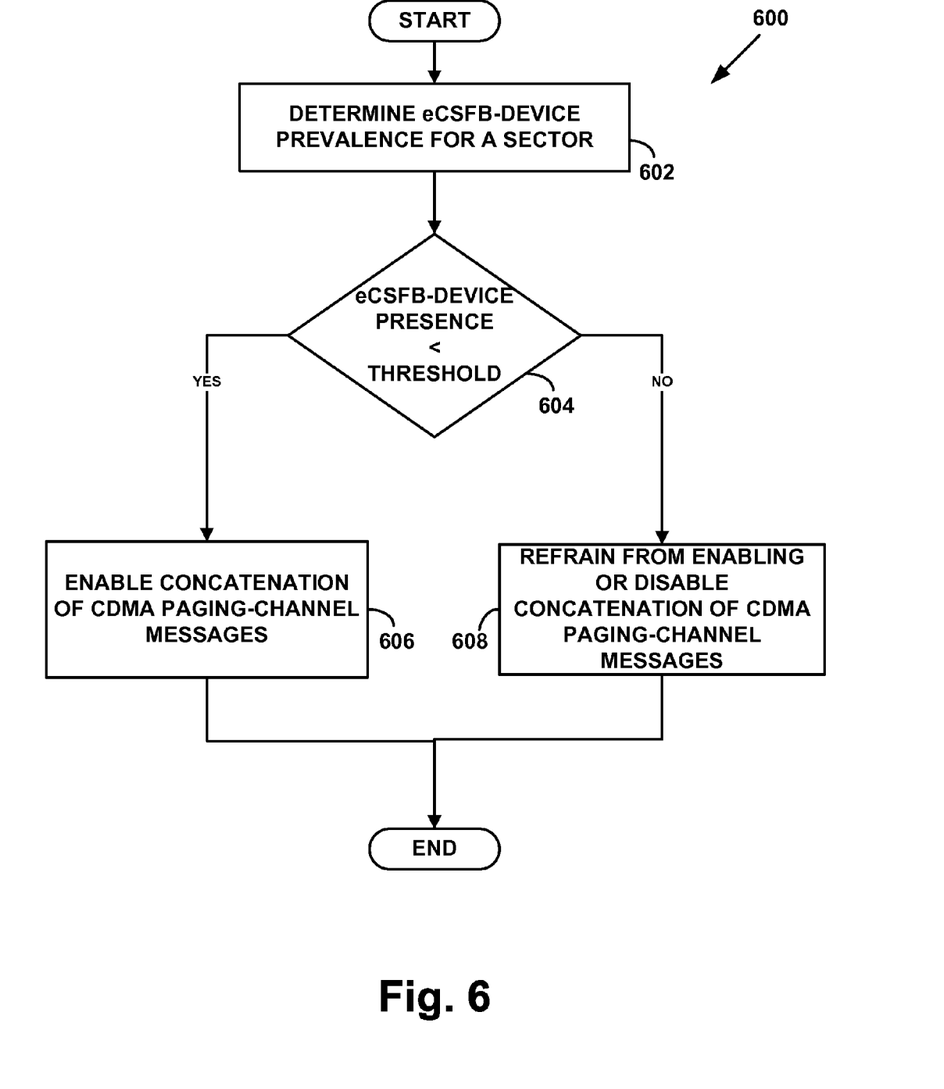
FIG. 6 is a flow chart illustrating a method for helping to more-efficiently utilize CDMA paging-channel resources, according to an exemplary embodiment.

For example, FIG. 6 is a flow chart illustrating a method 600 for helping to more-efficiently utilize CDMA paging-channel resources, according to an exemplary embodiment. Method 600 is an embodiment of method 500 in which a base station may dynamically enable and disable a concatenation feature for CDMA paging in a given sector, depending upon the prevalence of CSFB devices in the sector.

In particular, method 600 involves a base station determining the CSFB-device prevalence for a given sector, as shown by block 602. Then, the base station compares the determined CSFB-device prevalence to a threshold, as shown by block 604. If determined the CSFB-device prevalence is below the threshold, then the base station concatenates CDMA paging-channel messages in the sector (e.g., by enabling a concatenation feature), as shown by block 606. On the other hand, if the determined CSFB-device prevalence is above the threshold PCO, then the base station refrains from concatenating CDMA paging-channel messages in the sector (e.g., does not enable, or disables, the concatenation feature), as shown by block 608.

Further, in an exemplary embodiment, method 600 may be repeated periodically so as to dynamically enable and disable concatenation of pages. Yet further, method 600 may be performed for each sector served by the base station. Even further, the threshold to which the CSFB-device prevalence of a given sector is compared may differ from sector to sector (including between sectors that are served by the same base station), depending upon the particular implementation.

In some embodiments, a base station may implement a more granular selection of the concatenation level than that of method 600. For example, multiple ranges of eCSFB-WCD prevalence may be defined, such that selection may be made from between multiple concatenation levels. In particular, some implementations of method 600 may involve a base station selecting from between three or more possible concatenation levels.

E. Adjusting the Maximum Number of Page Attempts

In some embodiments, a base station may adjust other paging parameters of a coverage area, in addition or in the alternative to the concatenation level. For example, a base station may determine and set a maximum-attempt parameter for a coverage area based on the CSFB-device prevalence in the coverage area. As noted above, the maximum-attempt parameter for a coverage area specifies the maximum number of attempts that can be made to send a given page. Accordingly, a base station may generally increase the value of the maximum-attempt parameter for CDMA paging-channel messages, as the CSFB-device prevalence in the coverage area increases, and vice versa.

F. Adjusting the Page-Attempt Timer

In some embodiments, the RAN may determine and set the duration of the page-attempt timer for a coverage area based on the CSFB-device prevalence in the coverage area. As noted above, the duration of the page-attempt timer indicates a time to wait between successive attempts to send a given CDMA paging-channel message to a given WCD. Accordingly, a base station may generally reduce the duration of the page-attempt timer as the CSFB-device prevalence in the coverage area increases, and vice versa.

It should be understood that the above ways in which CDMA paging may be adjusted based on CSFB-device prevalence are provided for purposes of illustration and are not intended to be limiting. Other adjustments to CDMA paging are possible.

VI. CONCLUSION

Exemplary embodiments of the present invention have been described above. While various embodiments have been described in reference to CSFB and eCSFB implementations where a UE operating in an LTE network falls back to a CDMA network, those skilled in the art will understand that the methods and systems described herein may also apply for circuit-switched fall back in networks operating under other wireless communication protocols, such as a Global System for Mobile Communications (GSM) protocol, a General Packet Radio Service (GPRS) protocol, a Universal Mobile Telecommunications System (UMTS) protocol, or an Enhanced Data rates for GSM Evolution (EDGE) protocol, among other possibilities. Further, those of ordinary skill in the art will appreciate that numerous changes may be made from the embodiments described above without deviating from the scope of the invention as defined by the claims. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
a radio access network (RAN) determining a measure of circuit switch fallback (CSFB) device prevalence in a coverage area, wherein the RAN is configured to provide service in the coverage area under both a first and a second air-interface protocol, and wherein the RAN is configured to fall back from the second air-interface protocol to the first air-interface protocol according to a CSFB procedure;
using the measure of CSFB-device prevalence in the coverage area as a basis for updating one or more paging parameters for communications via a paging channel defined under the first air-interface protocol; and
applying the one or more updated paging parameters to communications with devices in the coverage area via the paging channel defined under the first air-interface protocol.

2. The method of claim 1, wherein the first air-interface protocol comprises a CDMA protocol, and wherein the second air-interface protocol comprises a Long-Term Evolution (LTE) protocol.

3. The method of claim 1, wherein the measure of CSFB-device prevalence in a coverage area comprises a measure of enhanced CSFB (eCSFB) device prevalence in a coverage area.

4. The method of claim 1, wherein said determining the one or more paging parameters for communications with via the paging channel defined under the first air-interface protocol comprises determining at least one quick-paging setting.

5. The method of claim 4, wherein said determining the at least one quick-paging setting comprises:
 if the measure of CSFB-device prevalence is greater than a predetermined threshold, then disabling a quick-paging function in the coverage area; and
 otherwise, enabling the quick-paging function in the coverage area.

6. The method of claim 5, further comprising, if the measure of CSFB-device prevalence is greater than the predetermined threshold, transmitting a message in the coverage area that indicates that the quick-paging function is disabled.

7. The method of claim 1, wherein said using the measure of CSFB-device prevalence in the coverage area as the basis for determining the one or more paging parameters for communications with via the paging channel defined under the first air-interface protocol comprises determining a period at which a device in the coverage area should listen to the paging channel.

8. The method of claim 1, wherein said using the measure of CSFB-device prevalence in the coverage area as the basis for determining the one or more paging parameters for communications with via the paging channel defined under the first air-interface protocol comprises determining a value for a slot cycle index based on the measure of CSFB-device prevalence.

9. The method of claim 8, wherein said determining the value for the slot cycle index based on the measure of CSFB-device prevalence comprises:
 if the measure of CSFB-device prevalence is less than a predetermined threshold, then setting the slot cycle index to be equal to a first value, wherein the first value corresponds to a first period between successive paging-channel slots that are assigned to a given device; and
 if the measure of CSFB-device prevalence is greater than the predetermined threshold, then setting the slot cycle index to be equal to a second value, wherein the second value corresponds to a second period between successive paging-channel slots that are assigned to a given device, wherein the second period is shorter than the first period.

10. The method of claim 1, wherein said using the measure of CSFB-device prevalence in the coverage area as the basis for determining the one or more paging parameters for communications with via the paging channel defined under the first air-interface protocol comprises determining a value for each of one or more overhead-message timing parameters based at least in part on the measure of CSFB-device prevalence.

11. The method of claim 10, wherein the at least one of the overhead-message timing parameters indicates a period between successive transmissions of a first type of overhead message over the paging channel defined under the first air-interface protocol.

12. The method of claim 11, wherein said determining the value for the at least one of the overhead-message timing parameters comprises:
 if the measure of CSFB-device prevalence is less than a predetermined threshold, then setting the overhead-message timing parameter to indicate a first period between successive transmissions of the overhead message; and
 if the measure of CSFB-device prevalence is greater than the predetermined threshold, then setting the overhead-message timing parameter to indicate a second period between successive transmissions of the overhead message, wherein the second period is shorter than the first period.

13. The method of claim 1, wherein the measure of CSFB-device prevalence comprises one or more of: (a) a number of CSFB devices that are associated with the coverage area and (b) a percentage of devices associated with the coverage area that are CSFB devices.

14. A non-transitory computer readable medium having stored therein instructions that are executable to cause at least one component of a radio access network (RAN) to perform functions comprising:
 determining a measure of circuit switch fallback (CSFB) device prevalence in a coverage area, wherein the RAN is configured to provide service in the coverage area under both a first and a second air-interface protocol, and wherein the RAN is configured to fall back from the second air-interface protocol to the first air-interface protocol according to a CSFB procedure;
 using the measure of CSFB-device prevalence in the coverage area as a basis for updating one or more paging parameters for communications via a paging channel defined under the first air-interface protocol; and
 applying the one or more updated paging parameters to communications with devices in the coverage area via the paging channel defined under the first air-interface protocol.

15. The non-transitory computer readable medium of claim 14, wherein said determining the one or more paging parameters for communications with via the paging channel defined under the first air-interface protocol comprises determining at least one quick-paging setting.

16. The non-transitory computer readable medium of claim 14, wherein said using the measure of CSFB-device prevalence in the coverage area as the basis for determining the one or more paging parameters for communications with via the paging channel defined under the first air-interface protocol comprises determining a period at which a device in the coverage area should periodically tune to the paging channel.

17. The non-transitory computer readable medium of claim 14, wherein said using the measure of CSFB-device prevalence in the coverage area as the basis for determining the one or more paging parameters for communications with via the paging channel defined under the first air-interface protocol comprises determining a value for each of one or more overhead-message timing parameters based at least in part on the measure of CSFB-device prevalence.

18. A method comprising:
 a radio access network (RAN) determining a measure of circuit switch fallback (CSFB) device prevalence in a coverage area, wherein the RAN is configured to provide service in the coverage area under both a third-generation (3G) protocol and a Long-Term Evolution (LTE) protocol;
 using the measure of CSFB-device prevalence in the coverage area as a basis for updating one or more paging parameters for communications via a 3G paging channel defined under the 3G protocol; and applying the one or more updated paging parameters to communications with devices in the coverage area via the 3G paging channel.

19. The method of claim 18, wherein said determining the one or more paging parameters for communications with via the paging channel defined under the first air-interface protocol comprises one or more of: (a) determining at least one quick-paging setting, (b) determining a period at which each device in the coverage area should periodically tune to the paging channel, and (c) determining a value for each of one or more overhead-message timing parameters based at least in part on the measure of CSFB-device prevalence.

20. The method of claim 18, wherein the 3G protocol comprises one of: (a) a code division multiple access (CDMA) protocol, (b) a Global System for Mobile Communications (GSM) protocol, (c) a General Packet Radio Service (GPRS) protocol, (d) a Universal Mobile Telecommunications System (UMTS) protocol, and (e) an Enhanced Data rates for GSM Evolution (EDGE) protocol.

* * * * *